UNITED STATES PATENT OFFICE.

GUSTAV EBERLE, DECEASED, LATE OF STUTTGART, GERMANY, BY ELSA EBERLE, BORN MUTSCHLER, EXECUTRIX, OF STUTTGART, GERMANY.

PREPARATION OF AMINO COMPOUNDS BY FERMENTATION.

1,254,033.

Specification of Letters Patent. Patented Jan. 22, 1918.

No Drawing. Application filed February 15, 1915. Serial No. 8,239.

*To all whom it may concern:*

Be it known that I, ELSA EBERLE, born MUTSCHLER, citizen of the German Empire, residing at Stuttgart, Germany, in the Kingdom of Wurttemberg, 51 Seestrasse, am the executrix of the estate of Dr. GUSTAV EBERLE, late of Stuttgart, Germany, who died on the battle-field on Sept. 8th, 1914, in France, and before dying had invented certain new and useful Improvements in Preparation of Amino Compounds by Fermentation; and I do hereby declare the following to be a full, clear, and exact description of the invention, such as will enable others skilled in the art to which it appertains to make and use the same.

It is known that a solution of pancreas exerts a decomposing influence on animal tissue. This is now ascribed exclusively to digestive ferments in the pancreas; for instance, see U. S. Patents, Nos. 1,006,539, Gustav Eberle, and 1,082,911, Otto Röhm. These have two properties, those of deliming and finishing *i. e.* firstly the property in presence of carbon-dioxid of forming readily soluble calcium salts which at rather low temperatures decompose into calcium carbonate and an amino acid or its calcium salt and thus removing lime in the most effective way from the skins, and secondly their property in presence of carbon-dioxid of dissolving calcium carbonate already formed with the formation of calcium salts of carbamino acids.

With reference to their acid strength, the various amino acids behave very differently. But in all cases a study of the most varied amino compounds has shown that they all possess the above properties. It will be understood that with respect to the power of dissolving lime and calcium carbonate in alkaline solution, the greatest action is to be expected from those amino acids which can combine with the relatively greatest amount of carbon-dioxid. (See Siegfried, *Zeitschrift für Physiologische Chemie* 1905, 44, 85.)

Exhaustive experiments have shown that for bating skins, exceedingly valuable amino compounds can be obtained by allowing animal organs such as liver, pancreas, etc., and in some cases substances of vegetable origin, to ferment owing to the enzyms contained therein or to subject them to a carefully conducted decomposing fermentation or to combine both processes. In some cases the process can be carried further by peptolytic enzyms.

Further experiments have shown that to save the rather expensive animal organs, equally good results may be attained by allowing other proteins to ferment or decompose with them, which themselves contain no decomposing enzyms (casein, glue) if desired with the addition of alkalis. In some cases proteolytic enzyms from the vegetable kingdom may be employed.

Further advantage can profitably be taken of the content of certain organs in other enzyms for the manufacture of valuable mordanting preparations *e. g.* in using the glands of the pancreas by adding thereto carbohydrates such as flour, starch, etc. The diastatic enzym of the pancreas then exerts its known saccharifying action followed by the occurrence of alcoholic fermentation which may be assisted by the later addition of yeast; this secures the formation of carbon-dioxid and thus the formation of carbamino acids. When the fermentation is quite over the enzyms still present are killed by heating to a temperature of over 60° Celsius.

Hitherto in technical circles the view has been held that the action of the mordant in the bating process was due to the proteolytic enzyms and bacteria which can be proved to be present; according to the present view however the proteolytic enzyms are not only not absolutely necessary but indeed frequently cause mistakes in the bating process, a fact which has hitherto not been recognized.

The preparations of amino acids so obtained can be used alone or in admixture of ammonium and alkali salts as so called complex acids. Of course these, obtained by the decomposition of and the action of bacteria on the pancreas, can also be used for mordanting.

In making the preparation it is not absolutely essential to kill the enzyms after the fermentation is complete. This process can be combined with the actual use of the preparation by treating it with boiling water and then using it as usual for mordanting.

Further experiments have shown that it is preferable to use fairly pure and especially fat-free proteins as initial materials and to obtain the enzyms separately allowing them to act, if necessary consecutively in known manner. In this way is avoided the necessary separation of fats and other less fermentable bodies which is usually necessary when the organs are allowed to ferment without added enzymes.

It has further been shown that the amino compounds obtainable by the decomposition of proteins can be advantageously employed for many other purposes as well as for mordanting hides, both in presence of the decomposing enzyms as well as after their destruction; thus a mixture prepared according to Example 1 may be used with advantage in dyeing with Turkish red to replace cow-dung.

The property of the amino compounds of reacting not only with alkalis but also with acids opens up a further field for their employment in the dyeing of skins and hides and in the dyeing and finishing, etc., of textile fibers.

The process of employing amino compounds appears of particular advantage in the manufacture of silk. A fermentation mixture still containing proteolytic enzyms can be used with advantage, in some cases in alkaline solution for degumming silk. Further it can replace the so-called silk soap (containing silk gum) if used in admixture with fats or soaps. When used as an addition to dye baths containing acids, amino compounds retard the taking up of the dye acid and thus cause a more equal dye.

Finally the amino compounds obtained by the autofermentation of animal organs with the exclusion of putrifying matter and if desired with the addition of enzym free proteins, carbohydrates, etc., may be used as food stuffs in some case after separation of the fat and unfermented protein. The salivary glands of the stomach, the liver, the spleen and similar organs which hitherto have not been used for their enzyms since they represented meat of small value, in this way form a very important initial material for the manufacture of very easily assimilable food stuffs.

*Example 1.*

10 kgs. of the salivary glands of the stomach are finely divided by means of a mincing machine and then subjected to autofermentation with the addition of chloroform or other bacterial poison which does not injure the enzym too much. After fermentation is complete the mass is heated to 65-70° Celsius till the fermentative action of the preparation is quite inhibited. During the process the mass separates into two parts of which the liquid part is especially rich in amino compounds while the other part partly contains less attacked protein bodies and partly fatty acids; after cooling the reaction mixture this latter part separates as solid masses on the surface. Now it is a further advantage of the process that there is a possibility of obtaining a preparation particularly rich in amino compounds and at the same time separating the components which are of less value for mordanting.

Example 2: Same as above without chloroform.

Example 3: The minced salivary glands of the stomach are mixed with kieselguhr, sawdust or other substances which have the power of absorbing liquids in large amounts; this mixture is then treated as in Examples 1 and 2. Such preparation can then be brought in to the market in the dry state.

Example 4: 10 kgs. of minced salivary glands of the stomach are mixed with 2 kgs. of casein dissolved in four liters of water with the addition of 400 grams ammonium hydroxid sp. gr. 0.9. Then proceed as above.

Example 5: Proceed as in Example 4 except that instead of using an alkaline casein solution, a suspension of 2 kgs. wheaten flour in four liters of water is employed, otherwise proceed as above.

I declare that what I claim is:—

1. A process for the manufacture of amino compounds by fermenting animal organs and then destroying the fermentative enzyms.

2. A process for the manufacture of a mordanting composition containing amino compounds which comprises fermenting animal organs by means of fermentative enzyms.

3. A process for the manufacture of amino compounds for mordanting skins comprising fermenting proteins by means of enzyms.

4. Process for the manufacture of amino compounds for mordanting skins comprising fermenting animal organs and vegetable proteins by enzymes.

5. Process for the manufacture of amino compounds suitable for foods by fermenting proteins by means of enzymes while preventing putrefaction.

6. Process for the manufacture of amino compounds suitable for use in the useful arts by fermentation of proteins mixed with carbo-hydrates.

In testimony whereof I affix my signature, in presence of two witnesses.

ELSA EBERLE, BORN MUTSCHLER,
*Executrix of estate of Dr. Gustav Eberle.*

Witnesses:
WALTER SCHWAEBSCH,
SOFIE RIES.